(12) United States Patent
Lin et al.

(10) Patent No.: US 10,460,070 B2
(45) Date of Patent: Oct. 29, 2019

(54) OPTIMIZED ELECTROMIGRATION ANALYSIS

(71) Applicant: Taiwan Semiconductor Manufacturing Company, Ltd., Hsinchu (TW)

(72) Inventors: Chin-Shen Lin, Taipei (TW);
Ching-Shun Yang, Hsinchu (TW);
Hsien Yu-Tseng, Miaoli (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 563 days.

(21) Appl. No.: 15/008,546

(22) Filed: Jan. 28, 2016

(65) Prior Publication Data

US 2017/0220725 A1    Aug. 3, 2017

(51) Int. Cl.
*G06F 17/50* (2006.01)
(52) U.S. Cl.
CPC ................................ *G06F 17/5081* (2013.01)
(58) Field of Classification Search
CPC .................................................... G06F 17/5081
See application file for complete search history.

(56) References Cited

U.S. PATENT DOCUMENTS

| 7,784,010 | B1 * | 8/2010 | Balsdon | G06F 17/5077 716/118 |
| 8,601,416 | B2 | 12/2013 | Kuo et al. | |
| 8,762,900 | B2 | 6/2014 | Shin et al. | |
| 8,775,993 | B2 | 7/2014 | Huang et al. | |
| 8,887,116 | B2 | 11/2014 | Ho et al. | |
| 8,943,445 | B2 | 1/2015 | Chen et al. | |
| 8,990,762 | B2 | 3/2015 | Yuh et al. | |
| 9,081,933 | B2 | 7/2015 | Liu et al. | |
| 9,183,341 | B2 | 11/2015 | Chen et al. | |
| 9,213,790 | B2 | 12/2015 | Hsu et al. | |
| 2004/0049750 | A1 * | 3/2004 | Gentry | G06F 17/5036 716/113 |
| 2004/0168136 | A1 * | 8/2004 | Mau | G06F 17/5036 716/115 |
| 2012/0060137 | A1 * | 3/2012 | Hui-Ru | G06F 17/5077 716/115 |
| 2013/0055184 | A1 * | 2/2013 | Shroff | G06F 17/5081 716/112 |

(Continued)

*Primary Examiner* — Vuthe Siek
*Assistant Examiner* — Aric Lin
(74) *Attorney, Agent, or Firm* — Sterne, Kessler, Goldstein & Fox P.L.L.C.

(57) ABSTRACT

A method of determining electromigration (EM) compliance of a circuit is performed. The method includes providing a layout of the circuit, the layout comprising one or more metal lines, and changing a property of one or more of the one or more metal lines within one or more nets of a plurality of nets in the layout. Each of the nets includes a subset of the one or more metal lines. The method also includes determining one or more current values drawn only within the one or more nets and comparing the determined one or more current values drawn with corresponding threshold values. Based on the comparison, an indication is provided whether or not the layout is compliant. A pattern of the one or more metal lines in the compliant layout is transferred to a mask to be used in the manufacturing of the circuit on a substrate.

20 Claims, 6 Drawing Sheets

(56) References Cited

U.S. PATENT DOCUMENTS

2014/0237435 A1 8/2014 Chen et al.
2014/0304670 A1 10/2014 Su et al.
2015/0278419 A1 10/2015 Yang et al.
2015/0370937 A1 12/2015 Liu et al.
2015/0370945 A1 12/2015 Lee

* cited by examiner

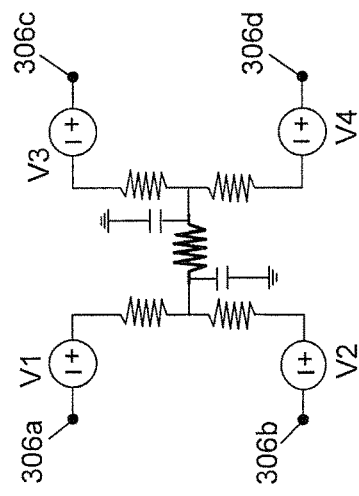
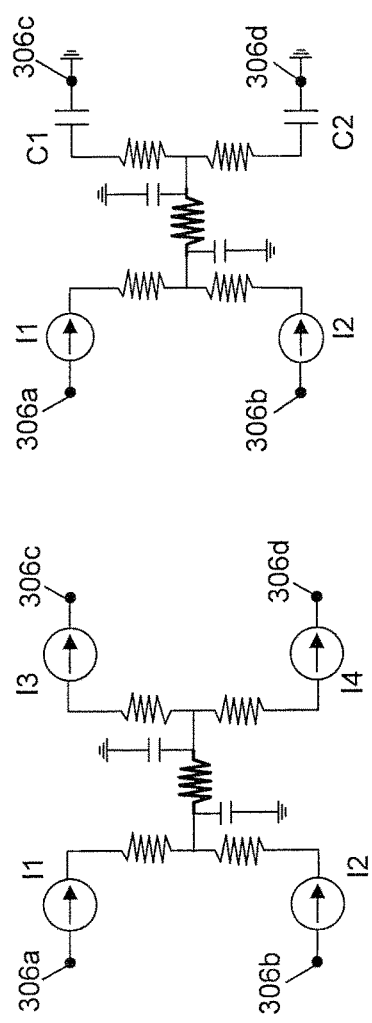
FIG. 6
FIG. 5
FIG. 4

OPTIMIZED ELECTROMIGRATION ANALYSIS

BACKGROUND

Electromigration (EM) is a term used to describe the transport of material caused by the gradual movement of the ions in a conductor due to the momentum transfer between conducting electrons and diffusing metal atoms. This effect is important in applications where high direct current densities are used, such as in microelectronics and related structures. As the structure size in electronics such as integrated circuits (ICs) decreases, the practical significance of this effect increases. If the effects of electromigration are not taken into account when designing the layout of the IC, the lifetime of the circuit may be drastically shortened.

Many different tools have been developed to aid in the design of integrated circuits. One of those tools is capable of reviewing a circuit layout and simulating the amount of current drawn throughout the circuit in order to determine of if the circuit is compliant with a series of EM rules applicable for a given manufacturing process. When IC layouts are large and complex, it becomes time consuming to perform the EM simulation each time a change is made to the elements of the layout.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4-6 illustrate example simulations of a net, in accordance with some embodiments.

DETAILED DESCRIPTION

Figure 1:
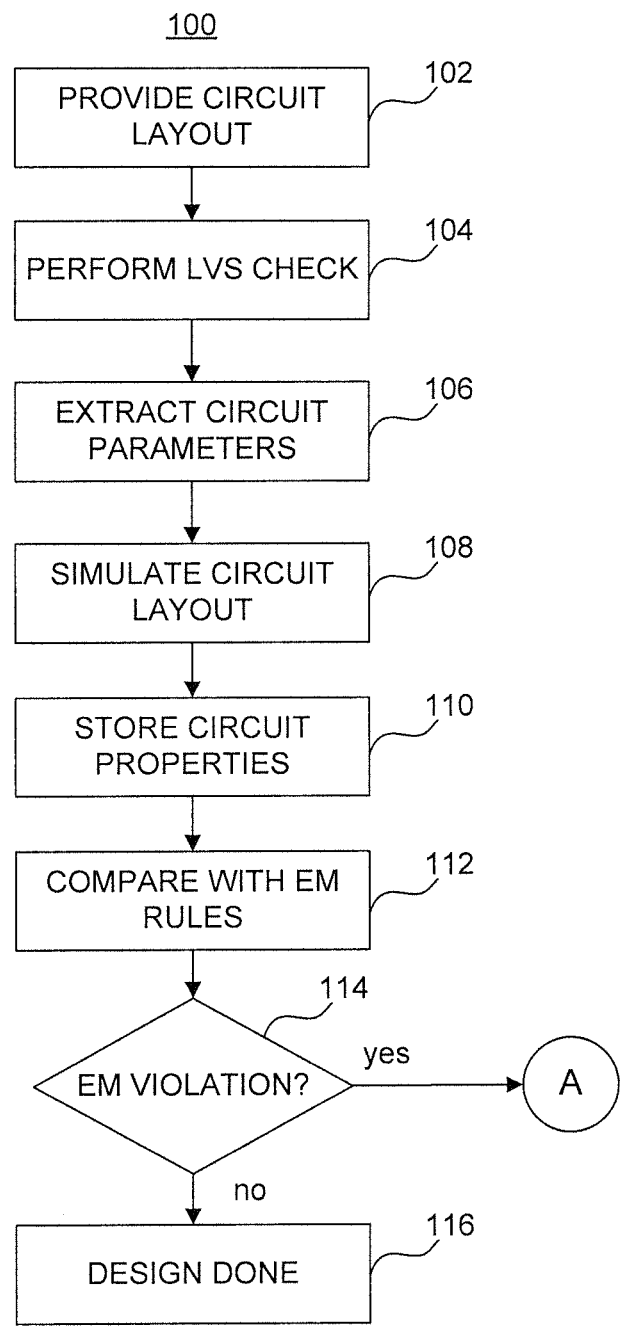
FIG. 1 is a flow diagram of an example EM analysis method, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

FIG. 1 illustrates an example method 100 of performing an EM analysis for a given layout, according to an embodiment. Method 100 may include other operations not illustrated here, and the various illustrated operations of method 100 may be performed in a different order than shown. According to an embodiment, method 100 represents a first EM simulation run performed on a given layout. Method 100 may be performed by one or more processing devices within a computing device. The computing device may be specially designed for high-speed calculations in order to perform EM simulations on large and complex circuit layouts.

At operation 102, a circuit layout has been provided to be simulated and checked for compliance with EM rules, according to an embodiment. The circuit layout includes a representation of the components, interconnects, and vias that make up the IC. Circuit components may include MOSTFETs, BJTs, diodes, resistors, capacitors, and inductors. This representation also includes the geometrical configuration of these elements as they are intended to be fabricated onto a substrate. The data of the circuit layout is commonly provided as a graphic database system (GDS) file. The most common industry standard circuit layout file formats include GDSII, GDSIII, and GDSIV. As an example, a circuit layout may include a plurality of transistors, a plurality of metal interconnects at various heights above the substrate surface, and a plurality of vias that provide electrical connection between different height levels above the substrate surface.

At operation 104, a circuit simulation is performed on the circuit layout to ensure that all connections have been properly made to each component, according to an embodiment. Any software capable of comparing the layout schematic of the circuit to a netlist of the circuit (looking for a match) may be used to perform this verification. Such software programs would be known to one skilled in the art.

At operation 106, layout parameters are extracted for the various elements of the circuit layout, according to an embodiment. The layout parameters may include geometry information such as the length, width, and thickness for each metal interconnect and the size of each via. The layout parameters may also include material properties of each metal interconnect and via based on what materials are chosen (e.g., aluminum, copper, or gold for metal interconnects; tungsten for vias, etc.) Each metal interconnect may also include a stack of different metals or metal alloys. The vias may also include a metal alloy.

In another embodiment, the layout parameters are used to determine parasitic electrical properties of the metal interconnects and vias. The parasitic electrical properties may include resistance, capacitance, and inductance of the metal interconnects and vias. For example, the resistance R of a straight metal interconnect having a length L, width w, thickness t, and a resistivity ρ is given by:

$$R = \rho \frac{L}{t \times w} \quad (1)$$

These parasitic electrical properties may be used instead of the geometrical layout parameters when simulating the circuit layout.

At operation 108, a simulation is performed on the circuit layout based on the values of the circuit components and the extracted layout parameters (or parasitic electrical properties) in order to determine circuit properties, according to an embodiment. The circuit properties may include current draw, voltages at each node, and capacitances throughout the circuit. The simulated circuit properties are used in the determination of whether the circuit layout is compliant with EM rules.

At operation 110, the simulated circuit properties of the circuit layout are stored for later use, according to an embodiment. The circuit properties may be stored in any known storage device, such as RAM, ROM, FLASH, etc. The circuit properties may only need to be stored during the first time that the circuit layout is simulated.

At operation 112, the simulated circuit properties are compared with various EM rules to determine if the properties are greater than a given threshold, according to an embodiment. The EM rules may be predetermined and used to determine if the current draw in any portion of the circuit layout exceeds a threshold value. For example, if the current drawn through a particular metal interconnect does exceed the threshold value, this would indicate that the metal interconnect fails the EM test, and thus the circuit layout is not compliant.

An example EM rule may have a threshold current of 1.235×(w−0.5) mA, where w is a width of a metal interconnect line, for any metal interconnect lines that have a length greater than 10 μm and a width greater than or equal to 100 nm. Thus, if any metal interconnect line that meets the geometry criteria draws a current greater than the threshold in this example, then the circuit layout would be non-compliant with the EM rules. There may be any number of EM rules based on the various geometric and material properties of each of the metal interconnect lines and vias.

At operation 114, the EM rules are used to determine if any of the simulated currents are higher than given threshold values. If any of the currents in the circuit layout are found to be too high, then a different series of operations are performed as denoted by the placeholder "A". If each of the currents are found to be compliant with the EM rules, then method 100 ends at operation 116.

Figure 2:
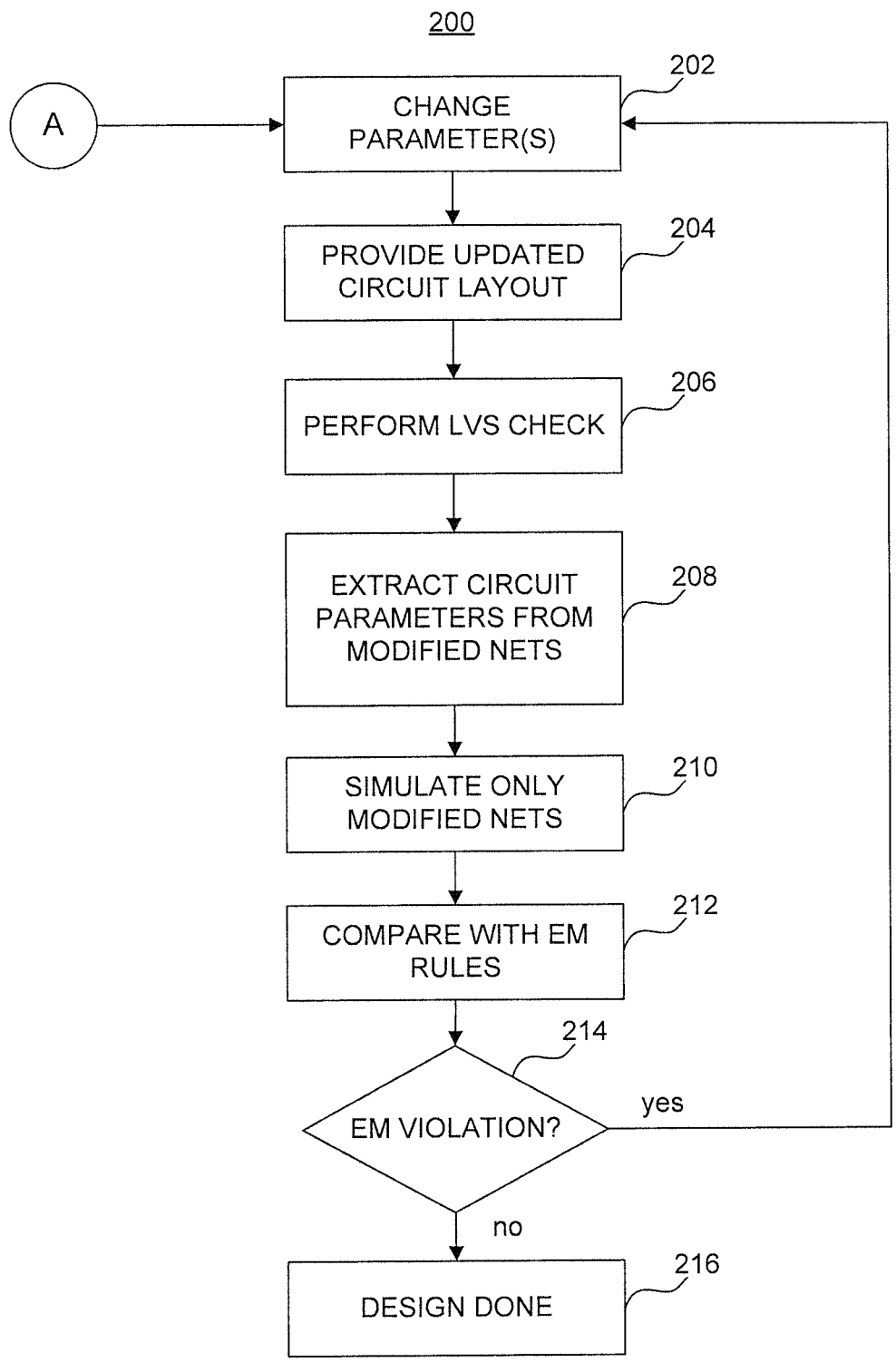
FIG. 2 is a flow diagram of an example EM analysis method, in accordance with some embodiments.

According to an embodiment, method 100 may be performed for the first time that a new circuit layout is to be simulated to check for compliance with EM rules. If any of the current values drawn in the circuit layout are found to be too high, a second method 200 illustrated in FIG. 2 may be performed to check for compliance by only simulating portions of the layout that have been changed.

Method 200 takes over from "A" in method 100. At operation 202, one or more parameters of the circuit layout are changed. The change may be made manually by a user using a user interface to interact with the circuit layout, or the change may be made automatically by the computer system performing the simulation. In an embodiment, the changed parameters include changing a width, a length, a thickness, and/or a material property of any of the metal interconnects in the circuit layout. In an embodiment, the changed parameters include changes to the size (i.e., geometric dimensions) and number of vias in the circuit layout. In an embodiment, the changed parameters include changes to features of the circuit components, such as changing the doping profile, gate length, or gate width of any of the transistors in the circuit layout. The changes to the circuit layout may be made in response to the circuit layout being found to be non-compliant with the EM rules. After the changes have been made, the circuit layout will herein be referred to as the updated circuit layout Method 200 continues with operation 204 where the updated circuit layout is provided to be simulated and checked for compliance with EM rules. This operation is similar to operation 102 from method 100, and thus will not be described in more detail here.

At operation 206, the updated circuit is simulated to ensure that all connections have been properly made to each component as also described above at operation 104 from method 100. In one embodiment, operation 206 is unnecessary if the only changes made to the circuit layout involve changes to the geometry or material properties of the metal interconnects or vias. This is because each component of the circuit would still be connected in the same way as when the circuit was simulated for the first time at operation 104 from method 100.

At operation 208, layout parameters are extracted only for the elements of the circuit layout within nets that have been modified, according to an embodiment. A circuit layout is comprised of a plurality of nets where each net includes some subset of the total number of metal interconnects that make up the circuit. If the circuit layout includes metal interconnects and vias, then each net includes some subset of the total number of metal interconnects and vias that make up the circuit. One net may be separated from an adjacent net by a circuit component such as, for example, a MOSTFET, BJT, diode, resistor, capacitor, or inductor.

For example, if the width of a specific metal interconnect line is changed, then only the parameters of the elements in the net that include that specific metal interconnect line are extracted. The parameters of any number of nets may be extracted, so long as each net includes an element with at least one changed parameter. The layout parameters may include geometry information such as the length, width, and thickness for each metal interconnect and the size of each via. The layout parameters may also include material properties of each metal interconnect and via based on what materials are chosen (e.g., aluminum, copper, or gold for metal interconnects; tungsten for vias, etc.)

As described previously, the layout parameters may be used to determine parasitic electrical properties of the metal interconnects and vias only within the nets that have been modified. These parasitic electrical properties may be used instead of the geometrical layout parameters when simulating the nets that have been modified.

At operation 210, a simulation is performed only on the nets that have been modified in order to determine circuit properties, according to an embodiment. The circuit properties may include current draw, voltages at each node, and capacitances throughout the circuit. The simulated circuit properties are used in the determination of whether the circuit layout is compliant with EM rules. By only running the simulation on modified nets (rather than the entire circuit layout), the speed of the simulation is greatly increased. This becomes increasingly important as circuit layouts become more and more complex.

Since only portions of the total circuit layout (i.e., only the nets that have been modified) are simulated, boundary conditions are imposed on the nodes of the nets, according to an embodiment. The circuit properties that were simulated in method 100 and stored at operation 110 are accessed from storage and used to determine the boundary conditions, according to an embodiment. For example, if a current of 30 µA was previously found to flow into a first node of a given net, then that same 30 µA current is used as a boundary condition at the first node during a subsequent simulation of the given net. This is explained in further detail in FIGS. 4-6.

At operation 212, the simulated circuit properties only within the modified nets are compared with various EM rules to determine if the properties are greater than a given threshold, according to an embodiment. This calculation is performed in the same way as previously described in operation 112 of method 100.

At operation 214, the EM rules are used to determine if any of the simulated currents within the modified nets are higher than given threshold values. If any of the currents in the modified nets are found to be too high, then method 200 returns back to operation 202 to allow for further changes to be made to the layout. If each of the currents in the modified nets are found to be compliant with the EM rules, then method 200 ends at operation 216.

FIGS. 3-6 illustrate an example of extracting a particular net from a circuit layout and simulating the extracted net to determine if the extracted net is compliant with EM rules.

Figure 3A:
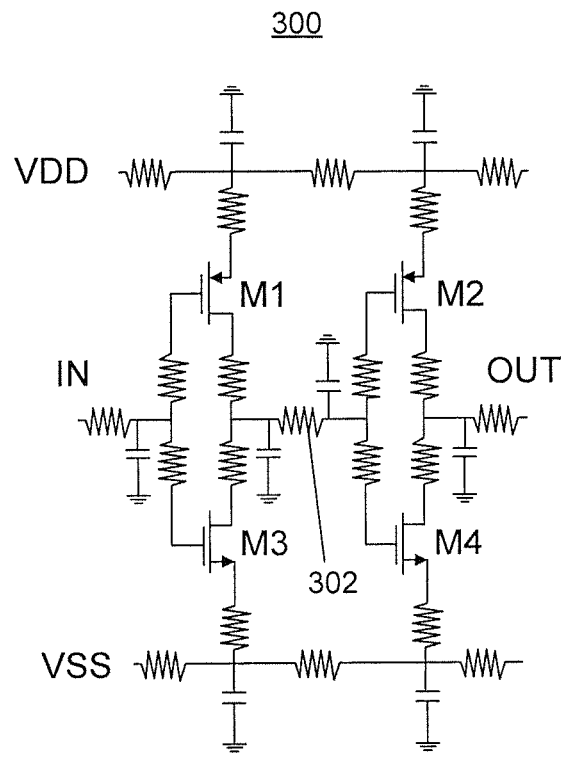
FIG. 3A illustrates an example circuit layout, in accordance with some embodiments.

FIG. 3A illustrates a representation of an example circuit layout 300, according to an embodiment. This representation presents circuit layout 300 as a circuit schematic, although other representations are possible to use as well. Circuit layout 300 includes voltage rails (VDD and VSS), four transistors (M1-M4), and numerous metal interconnects, with each metal interconnect being represented by the resistor symbol.

In an example, circuit layout 300 may be simulated for a first time using method 100 to determine if circuit layout 300 is compliant with EM rules. After the simulation is performed, a parameter of a metal interconnect 302 may be changed. For example, a width, length, thickness, or material property of metal interconnect 302 may be changed.

Figure 3B:
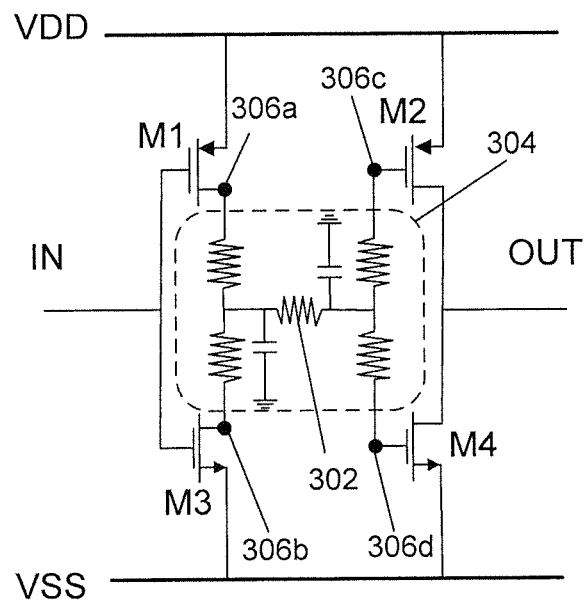
FIG. 3B illustrates a portion of the example circuit layout, in accordance with some embodiments.

FIG. 3B illustrates a representation of a net 304 from circuit layout 300 where net 304 includes metal interconnect 302. Since metal interconnect 302 has a changed property, net 304 is extracted and simulated without needing to simulate the current drawn in other areas of circuit layout 300. Net 304 is bound by four nodes (306a-306d), where each node is a terminal of a corresponding transistor, according to an embodiment.

FIGS. 4-6 illustrate example boundary conditions being applied to nodes 306a-306d of net 304 in order to simulate net 304 and determine if its compliant with EM rules, according to some embodiments.

In FIG. 4, currents I1-I4 are applied at respective nodes 306a-306d of net 304, according to an embodiment. The values of currents I1-I4 may be retrieved from the circuit parameters that were stored during the first simulation run of circuit layout 300. Based on the values of currents I1-I4 being applied to net 304, the different elements of net 304 can be tested for compliance with EM rules.

In FIG. 5, currents I1 and I2 are applied to nodes 306a and 306b respectively, while capacitances C1 and C2 are applied at nodes 306c and 306d, respectively, according to an embodiment. Capacitances C1 and C2 may be used to better represent the gate capacitance found at transistors M2 and M4, respectively. The values of currents I1 and I2, and capacitances C1 and C2, may be retrieved from the circuit parameters that were stored during the first simulation run of circuit layout 300. Based on the values of currents I1 and I2, and capacitances C1 and C2, being applied to net 304, the different elements of net 304 can be tested for compliance with EM rules.

In FIG. 6, voltages V1-V4 are applied at respective nodes 306a-306d of net 304, according to an embodiment. The values of voltages V1-V4 may be retrieved from the circuit parameters that were stored during the first simulation run of circuit layout 300. Based on the values of voltages V1-V4 being applied to net 304, the different elements of net 304 can be tested for compliance with EM rules.

Figure 7:
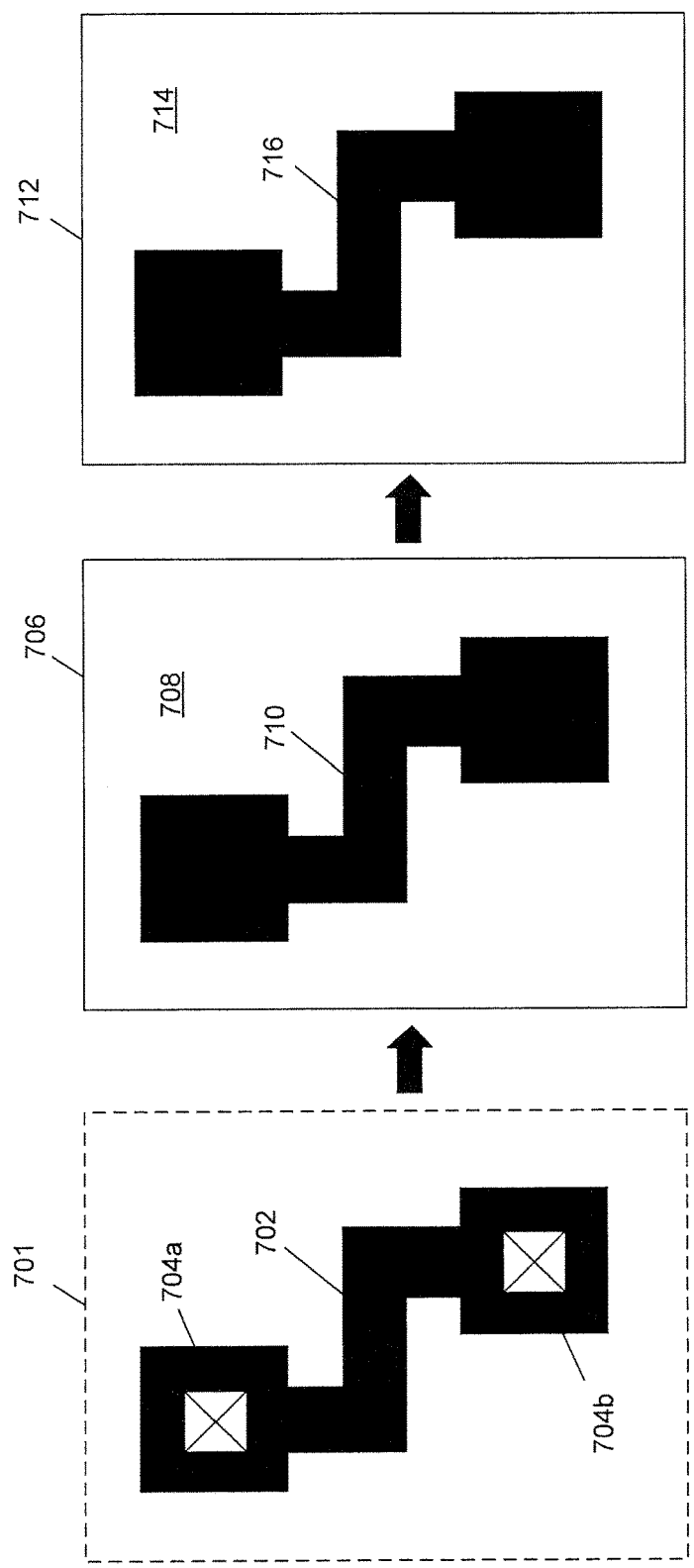
FIG. 7 illustrates a transfer process of an example layout to a substrate, in accordance with some embodiments.

Once a circuit layout has cleared the EM rules, it may then be used in the manufacturing of one or more masks that are, in turn, used to pattern the layout onto a substrate. FIG. 7 illustrates an example of this process.

FIG. 7 illustrates a portion 701 of an example circuit layout that includes metal interconnect 702 and vias 704a and 704b. Portion 701 may represent one net of the circuit layout. The layout represented in portion 701 may be compiled into a specific format and used as an input to a tool in order to fabricate a mask 706. For example, an electron beam tool may be used to pattern a layer of resist on mask 706. The electron beam tool would pattern the resist in the shape provided by the portion 701 of the circuit layout. Standard lithography operations may be performed to transfer the pattern in the resist to a pattern 710 on mask 706. These lithography operations would be understood by a person skilled in the art. Mask 706 ultimately has an area 708 surrounding a pattern 710 in the shape of the metal interconnect from portion 701 of the example circuit layout. Pattern 710 may be a metal layer that includes chromium. This type of mask 706 may be used for transmission lithography. In another embodiment, mask 706 may be a reflective mask where area 708 is an area that does not reflect light while pattern 710 is an area that does reflect light, or vice-versa.

Mask 706 is then used to pattern a beam of radiation incident onto a substrate 712, according to an embodiment. Substrate 712 may be a semiconductor substrate such as silicon, gallium arsenide, indium phosphide, etc., or substrate 712 may be an insulating substrate such as a glass or sapphire wafer. Standard lithography techniques are used to pattern a layer of metal on substrate 712. For example, metal trace 716 may be patterned in the shape of metal pattern 710 from mask 706. Metal trace 716 may be patterned over a dielectric material 714. Some examples of metal trace materials include aluminum, copper, gold, or any alloy thereof. Metal trace 716 may include a stack of different metal layers. Some examples of dielectric material 714 include silicon dioxide, silicon nitride, and low-K dielectrics. A thickness of metal trace 716 is determined by the fabrication process.

In this example, metal trace 716 exists at some height above the surface of substrate 712. This height depends on a thickness of dielectric material 714, as well as the number of other layers between dielectric material 714 and the surface of substrate 712. A different mask would be fabricated to pattern vias 704a and 704b, for example. Each layer of patterned metal interconnects and vias may use a different mask in the fabrication of an IC on substrate 712.

Figure 8:
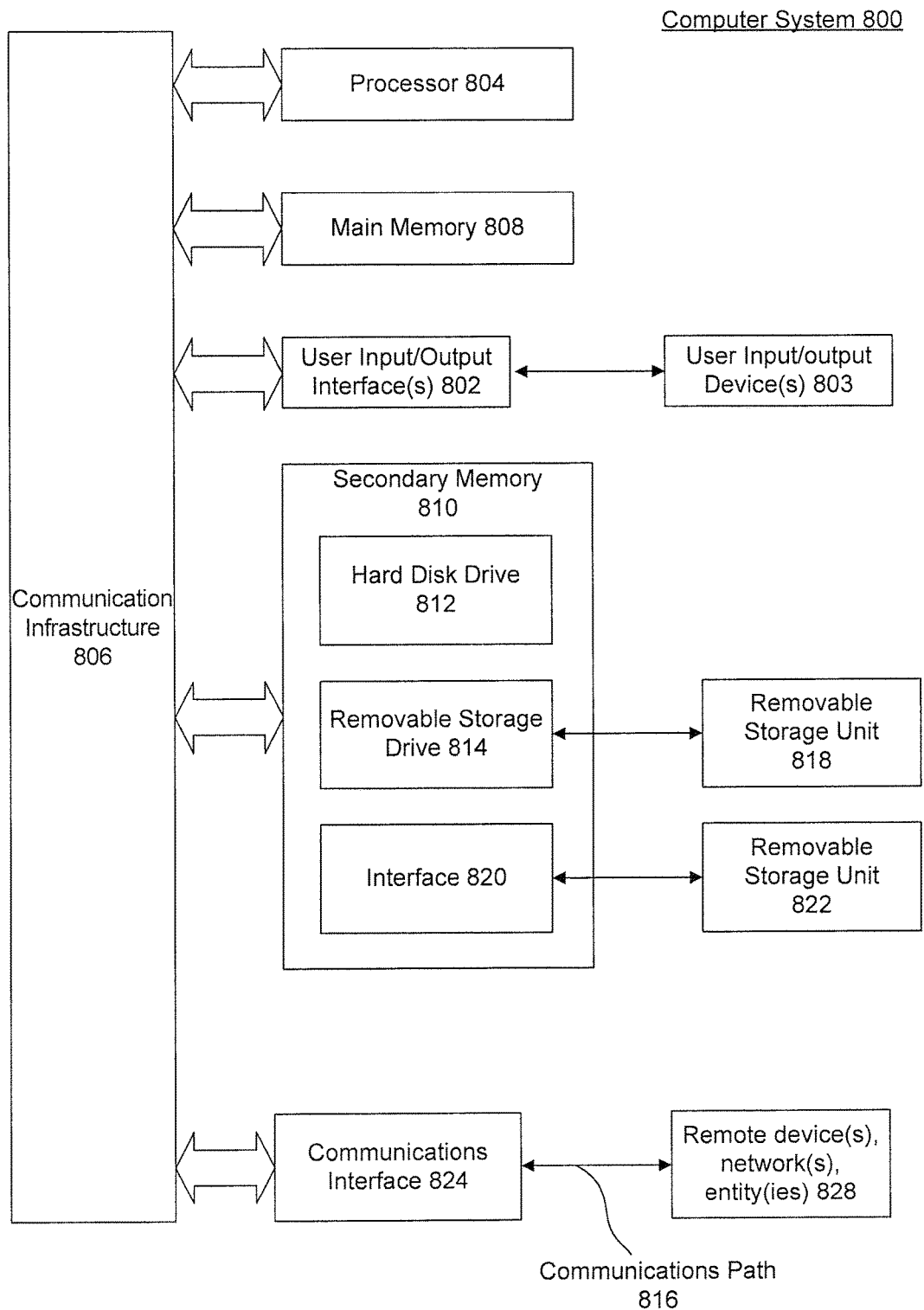
FIG. 8 is a block diagram of an example computer system useful for implementing various embodiments.

The EM rule simulations as well as various operations of methods 100 and 200 described thus far can be implemented, for example, using one or more well-known computer systems, such as computer system 800 shown in FIG. 8.

Computer system 800 includes one or more processors (also called central processing units, or CPUs), such as a processor 804. Processor 804 is connected to a communication infrastructure or bus 806. In one embodiment, processor 804 is implemented wholly or in part by a field programmable gate array (FPGA). In another example, processor 804 is a digital signal processor (DSP). In other embodiments processor 804 is a microprocessor.

One or more processors 804 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disc drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disc, Digital Versatile Disc (DVD), optical storage disk, and/or any other computer data storage device. Removable storage drive 814 reads from and/or writes to removable storage unit 818 in a well-known manner.

Secondary memory 810 may include other means, instrumentalities, or approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and universal serial bus (USB) port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 816, which may be wired and/or wireless, and which may include any combination of local area networks (LANs), wide area networks (WANs), the Internet, etc. Control logic and/or data may be transmitted to and from computer system 800 via communication path 816.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the various embodiments using data processing devices, computer systems and/or computer architectures other than that shown in FIG. 8. In particular, embodiments may operate with software, hardware, and/or operating system implementations other than those described herein.

Example Embodiments and Benefits

In various embodiments, a method of determining electromigration (EM) compliance of a circuit is performed. The method includes providing a layout of the circuit, the layout comprising one or more metal lines, and changing a property of one or more of the one or more metal lines within one or more nets of a plurality of nets in the layout. Each of the nets includes a subset of the one or more metal lines. The method also includes determining one or more current values drawn only within the one or more nets and comparing the determined one or more current values drawn with corresponding threshold values. Based on the comparison, an indication is provided whether or not the layout is compliant. A pattern of the one or more metal lines in the compliant layout is transferred to a mask to be used in the manufacturing of the circuit on a substrate.

Embodiments of determining EM compliance described herein may be used to generate compliant layouts that are then used, like a blueprint, to fabricate one or more masks. These masks are used during standard lithography processes to form the patterns of the compliant layout on a substrate.

Embodiments described herein may be used to substantially decrease the overall simulation time for testing a circuit layout for EM compliance. By only simulating portions (e.g., nets) of the circuit layout that include changed elements, the entire circuit layout does not need to be simulated again when a change is made anywhere in the circuit layout.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, is not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method performed by one or more processing devices to determine an electromigration (EM) compliance of a circuit, the method comprising:
    providing a layout of the circuit, wherein the layout comprises a plurality of voltage supplies, a plurality of circuit components, and a plurality of metal lines wherein:
        each of the plurality of voltage supplies comprises a voltage source and voltage rail metal lines connected to the voltage source, wherein the voltage rail metal lines are connected to first terminals of the plurality of circuit components; and
        the plurality of metal lines are connected to second terminals of the plurality of circuit components;
    determining one or more first electrical properties of the layout;
    comparing the one or more first electrical properties to a plurality of EM rules;
    in response to the one or more first electrical properties violating the plurality of EM rules, modifying the layout to change a property of at least one metal line in the plurality of metal lines;
    determining one or more second electrical properties of the plurality of metal lines in the modified layout based on the one or more first electrical properties;
    comparing the one or more second electrical properties to the plurality of EM rules; and
    in response to the one or more second electrical properties passing the plurality of EM rules, providing an indication that the modified layout is compliant, wherein a pattern of the modified layout is transferred to a mask to be used in the manufacturing of the circuit on a substrate.

2. The method of claim 1, wherein determining the one or more first electrical properties comprises simulating the layout and storing the simulated electrical properties of the layout in a storage device.

3. The method of claim 1, wherein modifying the layout comprises changing at least one of a width, a length, a thickness, and a material property of the at least one metal line.

4. The method of claim 1, wherein each of the plurality of EM rules comprises a predetermined threshold value of an electrical property associated with geometric and material properties of the plurality of metal lines.

5. The method of claim 1, wherein the one or more second electrical properties comprise one or more currents flowing through the plurality of metal lines in the modified layout.

6. The method of claim 1, wherein the one or more first electrical properties comprise:
    one or more voltages, currents, and capacitances at the second terminals of the plurality of circuit components; and
    one or more currents flowing through the plurality of metal lines in the layout.

7. The method of claim 1, wherein the layout comprises one or more vias, and wherein modifying the layout comprises changing a size of the one or more vias.

8. The method of claim 1, wherein each of the plurality of circuit components comprises a transistor, a diode, a resistor, a capacitor, or an inductor.

9. The method of claim 1, wherein the layout further comprises an other plurality of metal lines connected to third terminals of the plurality of circuit components, and wherein the determining one or more second electrical properties comprises applying the one or more first electrical properties.

10. A non-transitory storage medium having instructions stored thereon that, when executed by one or more processing devices, cause the one or more processing devices to perform actions comprising:
    providing a layout that comprises a voltage source, a voltage rail connected to the voltage source, a plurality of circuit components, and a net, wherein:
        the voltage rail comprises one or more voltage rail metal lines connected to the voltage source and first terminals of the plurality of circuit components; and
        the net comprises one or more metal lines connected to second terminals of the plurality of circuit components;
    determining one or more first electrical properties of the layout;
    modifying the layout to change a property of at least one metal line of the net;
    determining one or more second electrical properties of the net in the modified layout based on the one or more first electrical properties;
    comparing the one or more second electrical properties with a plurality of electromigration (EM) rules; and
    in response to the one or more second electrical properties passing the plurality of EM rules, providing an indication that the modified layout is compliant, wherein a pattern of the modified layout is transferred to a mask to be used in the manufacturing of the circuit on a substrate.

11. The non-transitory storage medium of claim 10, wherein the one or more processing devices further stores the one or more first electrical properties in a storage device.

12. The non-transitory storage medium of claim 10, wherein modifying the layout comprises changing at least one of a width, a length, a thickness, and a material property of the at least one metal line in the net.

13. The non-transitory storage medium of claim 10, wherein each of the plurality of EM rules comprises a predetermined threshold value of an electrical property associated with geometric and material properties of the one or more metal lines in the net.

14. The non-transitory storage medium of claim 10, wherein the one or more first electrical properties comprise:
   one or more currents, voltages, and capacitances at the second terminals of the plurality of circuit components; and
   one or more currents flowing through the net in the layout.

15. The non-transitory storage medium of claim 10, wherein the layout comprises one or more vias, and wherein modifying the layout comprises changing a size of the one or more vias.

16. The non-transitory storage medium of claim 10, wherein each of the plurality of circuit components comprises a transistor, a diode, a resistor, a capacitor, or an inductor.

17. A method, comprising:
   providing a layout of a circuit, wherein the layout comprises a voltage source, a plurality of circuit components, a voltage rail connected to the voltage source, a first net, and a second net, wherein:
      the voltage rail comprises one or more voltage rail metal lines connected to the voltage source and first terminals of the plurality of circuit components;
      the first net comprises one or more first metal lines connected to second terminals of the plurality of circuit components; and
      the second net comprises one or more second metal lines connected to third terminals of the plurality of circuit components;
   determining a first electrical property of the first net, the second net, and the plurality of circuit components;
   comparing the first electrical property of the first and second nets to a plurality of EM rules;
   in response to the first electrical property violating the plurality of EM rules, modifying the layout to change a property of at least one first metal line in the first net;
   determining a second electrical property of the first net in the modified layout, comprising:
      applying the first electrical property of the second net; and
      updating the first electrical property of the first net in the modified layout based on the first electrical property of the second terminals of the plurality of circuit components;
   comparing the second electrical property to the plurality of EM rules; and
   in response to the second electrical property passing the plurality of EM rules, providing an indication that the modified layout is compliant, wherein a pattern of the modified layout is transferred to a mask to be used in the manufacturing of the circuit on a substrate.

18. The method of claim 17, wherein the updating the first electrical property comprises updating the first electrical property based on the first electrical property of the third terminals of the plurality of circuit components.

19. The method of claim 17, wherein the plurality of circuit components comprise a first circuit and a second circuit, wherein:
   the first circuit comprises one of the first terminals; and
   the second circuit comprises one of the second or third terminals.

20. The method of claim 17, wherein each of the first and second electrical properties comprises a voltage, a current, or a capacitance.

* * * * *